United States Patent
Jaradi et al.

(10) Patent No.: US 12,043,206 B2
(45) Date of Patent: Jul. 23, 2024

(54) LOAD LIMITING SEATBELT RETRACTOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 17/852,454

(22) Filed: Jun. 29, 2022

(65) Prior Publication Data
US 2024/0001886 A1 Jan. 4, 2024

(51) Int. Cl.
*B60R 22/28* (2006.01)
*B60R 22/48* (2006.01)
*B60R 22/38* (2006.01)

(52) U.S. Cl.
CPC .............. *B60R 22/28* (2013.01); *B60R 22/48* (2013.01); *B60R 2022/286* (2013.01); *B60R 2022/287* (2013.01); *B60R 2022/288* (2013.01); *B60R 22/38* (2013.01)

(58) Field of Classification Search
CPC ....... B60R 22/28; B60R 22/34; B60R 22/341; B60R 22/3413; B60R 22/38; B60R 22/48; B60R 22/4858; B60R 2022/287; B60R 2022/288; B60R 2022/385; B60R 2022/4825
See application file for complete search history.

(56) References Cited

U.S. PATENT DOCUMENTS

| | | | |
|---|---|---|---|
| 6,206,315 B1* | 3/2001 | Wier | B60R 22/3413 242/379.1 |
| 7,410,113 B2* | 8/2008 | Keller | B60R 22/3413 242/382.5 |
| 8,262,133 B2* | 9/2012 | Usoro | B60R 22/4676 297/479 |
| 10,525,923 B2* | 1/2020 | O'Connor | B60R 21/0132 |
| 2020/0247353 A1* | 8/2020 | Specht | B60R 22/34 |
| 2022/0063538 A1* | 3/2022 | Faruque | G01G 19/52 |

FOREIGN PATENT DOCUMENTS

| | | | | |
|---|---|---|---|---|
| CN | 105539354 A | * | 5/2016 | |
| DE | 10030855 A1 | * | 1/2002 | ............. B60R 22/34 |
| DE | 102008041510 A1 | * | 3/2010 | ......... B60R 22/3413 |
| DE | 102008041510 A1 | | 3/2010 | |
| WO | WO-9749583 A1 | * | 12/1997 | ......... B60R 22/3413 |

* cited by examiner

*Primary Examiner* — Michael R Mansen
*Assistant Examiner* — William Ty Sessums
(74) *Attorney, Agent, or Firm* — Frank A. MacKenzie; Bejin Bieneman PLC (57) ABSTRACT

A vehicle includes a seatbelt retractor. The seatbelt retractor includes a housing. The seatbelt retractor includes a spool having a first end and a second end each rotatably supported by the housing. The spool is elongated on an axis from the first end to the second end. The seatbelt retractor includes a torsion bar having a first end fixed to the first end of the spool and a second end operatively engaged with the housing. The torsion bar has a central cavity. The seatbelt retractor includes a heating filament disposed in the central cavity.

17 Claims, 8 Drawing Sheets

LOAD LIMITING SEATBELT RETRACTOR

BACKGROUND

A seatbelt in a vehicle may be equipped with load-limiting features. During a vehicle impact, a retractor of the seatbelt may lock webbing of the seatbelt from further extension from the retractor, and load-limiting features may permit some additional limited extension of the webbing when the force exerted on the webbing exceeds a load-limiting threshold. This additional extension of the webbing from the retractor limits the load applied by the webbing to the chest of an occupant, which may limit chest compression.

The function of the load-limiting features is dependent upon the size of the occupant, e.g., the weight of the occupant. In other words, at a given speed of the vehicle impact, a large occupant may exert a load on the webbing exceeding the load-limiting threshold whereas, at that same speed, the load exerted on the webbing by a small occupant may not exceed the load-limiting threshold.

DETAILED DESCRIPTION

A seatbelt retractor includes a housing. The seatbelt retractor includes a spool having a first end and a second end each rotatably supported by the housing, the spool being elongated on an axis from the first end to the second end. The seatbelt retractor includes a torsion bar having a first end fixed to the first end of the spool and a second end operatively engaged with the housing. The torsion bar has a central cavity and a heating filament disposed in the central cavity.

The central cavity may be elongated between the first end of the torsion bar and the second end of the torsion bar.

The heating filament may be elongated between the first end of the torsion bar and the second end of the torsion bar.

The heating filament may have a terminal end, the terminal end being adjacent the first end of the torsion bar.

The seatbelt retractor may include controller programmed to modulate an elevated temperature of the heating filament.

The controller may be programmed to modulate the elevated temperature of the heating filament in response to a detected occupant size.

The controller may be programmed to determine occupant size based on input from an occupancy sensor.

The controller may be programmed to increase the elevated temperature of the heating filament in response to a detected occupant size.

The torsion bar may have a rotational yield strength, the rotational yield strength being lowered by the elevated temperature of the heating filament.

The seatbelt retractor may include a thermal insulator, the thermal insulator surrounding the torsion bar.

The seatbelt retractor may include a second thermal insulator, the second thermal insulator surrounding the spool.

The seatbelt retractor may include a thermal insulator, the thermal insulator surrounding the spool.

The seatbelt retractor may include a webbing surrounding the spool, the insulator being between the spool and the webbing.

The seatbelt retractor may include a power source, the heating filament being connected to the power source.

The heating filament may include a terminal end and a cavity end, the power source being connected to the terminal end.

The seatbelt retractor may include a controller, the controller programmed to modulate the power source in response to a detected occupant size.

The housing may have a first end and a second end, and further comprising a locking device supported on the second end of the housing and being operatively engaged with the second end of the torsion bar.

An assembly for a vehicle 12 is shown. The vehicle 12 includes a seatbelt retractor 14. The seatbelt retractor 14 includes a housing 16. The seatbelt retractor 14 includes a spool 18 having a first end and a second end each rotatably supported by the housing 16. The spool 18 is elongated on an axis from the first end to the second end. The seatbelt retractor 14 includes a torsion bar 20 having a first end fixed to the first end 18*a* of the spool 18 and a second end operatively engaged with the housing 16. The torsion bar 20 has a central cavity 22. The seatbelt retractor 14 includes a heating filament 24 disposed in the central cavity 22.

The spool 18 rotates in the housing 16. A webbing 26 is supported on the spool 18. Specifically, the webbing 26 is wrapped around the spool 18 and the webbing 26 is extended from the seatbelt retractor 14 by rotating the spool 18 in the housing 16. Since the torsion bar 20 is fixed to the first end 18*a* of the spool 18, when the spool 18 rotates, the torsion bar 20 rotates. During use, an occupant of the vehicle 12 exerts a force on the seatbelt retractor 14, i.e., the webbing 26, causing the spool 18 to rotate. The housing 16 restricts rotation of the torsion bar 20 at the second end. When the force exerted on the seatbelt retractor 14 exceeds the rotational yield strength of the torsion bar 20, the torsion bar 20 plastically deforms to allow the spool 18 to rotate and allow the webbing 26 to be extended from the seatbelt retractor 14. Because the heating filament 24 is disposed in the central cavity 22 of the torsion bar 20, the heating filament 24 can heat the torsion bar 20. At a higher temperature, the rotational yield strength of the torsion bar 20 is reduced, thus by heating the torsion bar 20, the force required to plastically deform the torsion bar 20 is reduced. In other words, by heating the torsion bar 20, the seatbelt retractor 14 can be adjusted for different sized occupants.

The vehicle 12 may be any suitable type of ground vehicle, e.g., a passenger or commercial automobile such as a sedan, a coupe, a truck, a sport utility, a crossover, a van, a minivan, a taxi, a bus, etc. The vehicle 12 includes a frame and a body (not numbered). The body may be of unitary construction, in which the frame is unitary with the body including frame rails, rockers, pillars, roof rails, etc. As another example, the body and frame may have a body-on-frame construction (also referred to as a cab-on-frame construction) in which the body (including rockers, pillars, roof rails, etc.) and frame are separate components, i.e., are modular, and the body is supported on and affixed to the frame. Alternatively, the frame and body may have any suitable construction. The frame and the body may be of any suitable material, for example, steel, aluminum, and/or fiber-reinforced plastic, etc.

The frame and/or the body defines a passenger compartment (not numbered) to house occupants, if any, of the vehicle 12. The passenger compartment may extend across the vehicle 12, i.e., from one side to the other side of the vehicle 12. The passenger compartment includes a front and a rear. The passenger compartment includes one or more seats 28. The seats 28 may be arranged in any suitable manner in the passenger compartment. The seats 28 may be of any suitable type, e.g., a bucket seat as shown in the Figures.

The vehicle 12 includes a seatbelt assembly 30. The seatbelt assembly 30 includes the seatbelt retractor 14 and the webbing 26 extendable from the seatbelt retractor 14. The seatbelt assembly 30 may include an anchor (not shown) coupled to the webbing 26, and a clip that engages a buckle (not shown). The seatbelt assembly 30 may be disposed adjacent the seat. For example, the seatbelt assembly 30 is adjacent the front seat. The seatbelt assembly 30, when fastened, controls the kinematics of the occupant of the seat, e.g., during sudden decelerations of the vehicle 12.

The webbing 26 may extend continuously from the seatbelt retractor 14 to the anchor. For example, one end of the webbing 26 feeds into the seatbelt retractor 14, and the other end of the webbing 26 is fixed to the anchor. The anchor may, for example, be fixed to the seat. Alternatively, the anchor may be fixed to the vehicle body, e.g., the B-pillar, the floor, etc. The anchor may be attached to the seat 28 in any suitable manner, e.g., with fasteners.

The webbing 26 may be fabric, e.g., polyester. The clip slides freely along the webbing 26 and, when engaged with the buckle, divides the webbing 26 into a lap band and a shoulder band.

The seatbelt assembly 30 may be a three-point harness, meaning that the webbing 26 is attached at three points around the occupant when fastened: the anchor, the seatbelt retractor 14, and the clip/buckle. The seatbelt assembly 30 may, alternatively, include another arrangement of attachment points.

The seatbelt retractor 14 may be supported at any suitable location in the vehicle 12. As shown in the Figures, the seatbelt retractor 14 is supported on the frame, e.g., the housing 16 may be fixed to the frame. The seatbelt retractor 14 may be supported on the frame at any suitable location. In other examples, the seatbelt retractor 14 is supported on the seatback. Specifically, the housing 16 is fixed to the seatback. The housing 16 may be fixed to the seatback in any suitable manner, e.g., a fastener, etc.

As described above, the seatbelt retractor 14 includes the housing 16. The housing 16 has a first end and a second end spaced from the first end along the axis. The housing 16 may be of any suitable size and shape. The housing 16 may be of any suitable material, e.g., plastic, metal, composite, etc.

The seatbelt retractor 14 includes a spring 32. The spring 32 may be coupled to the spool 18 and the housing 16. In the example shown in FIGS. 2-3, the spring 32 is disposed at the first end 16a of the housing 16. Specifically, the spring 32 is engaged with the first end 18a of the spool 18 to retract the webbing 26. The spring 32 may be loaded in tension or compression when the webbing 26 is fully retracted, and the spring 32 may be further loaded in either tension or compression when the webbing 26 is extended from the spool 18. When the occupant force is exerted on the webbing 26, the spring 32 uncoils and the webbing 26 is extended from the spool 18. When the occupant force applied to the webbing 26 is released, no rotational force is exerted on the spool 18 and the spring 32 exerts a force tending to retract the webbing 26. The spring 32 may be, for example, a spiral torsion spring 32 or any other suitable type of spring 32.

Figure 1:
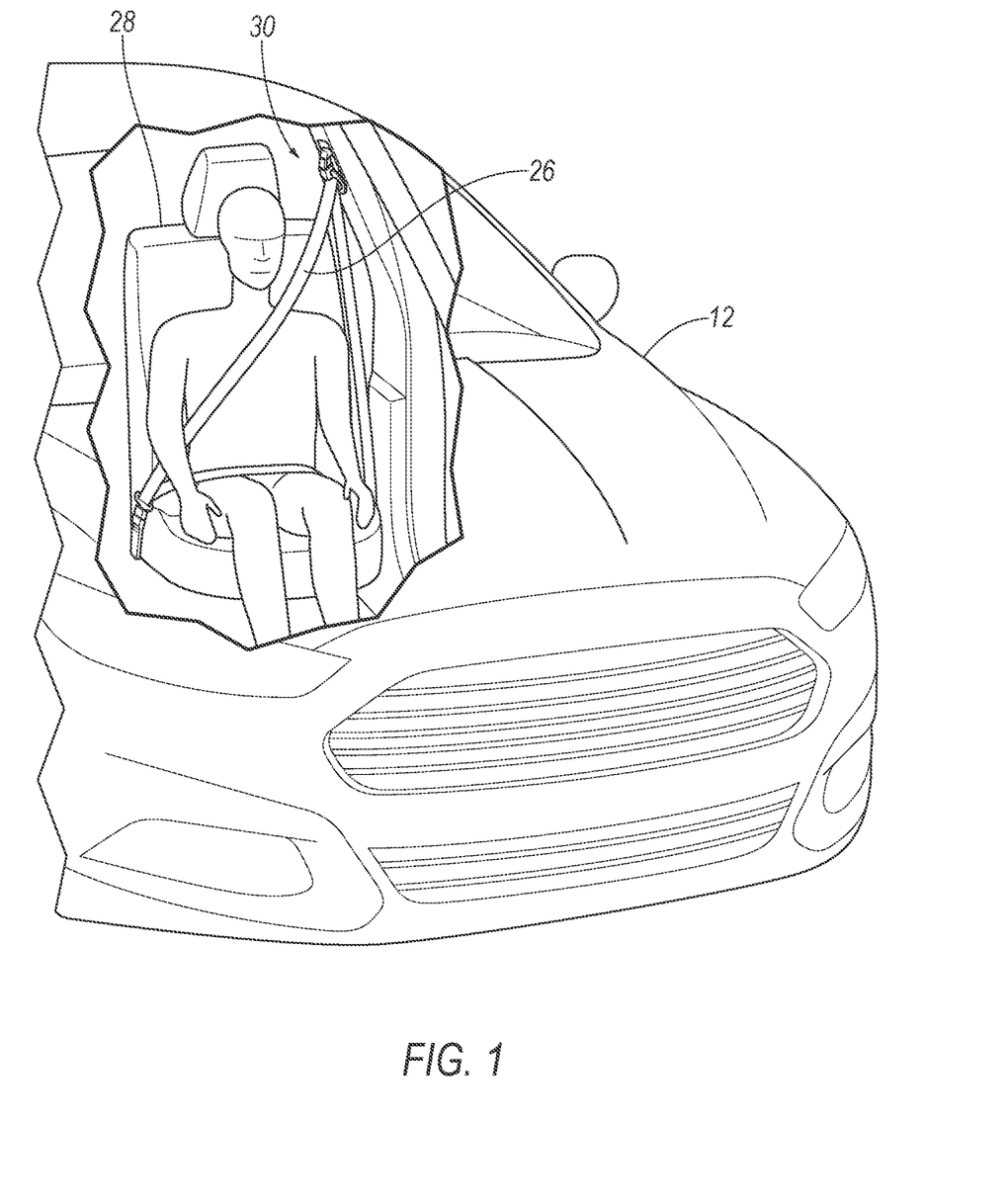
FIG. 1 is a perspective view of a vehicle including a seatbelt assembly.
Figure 2:
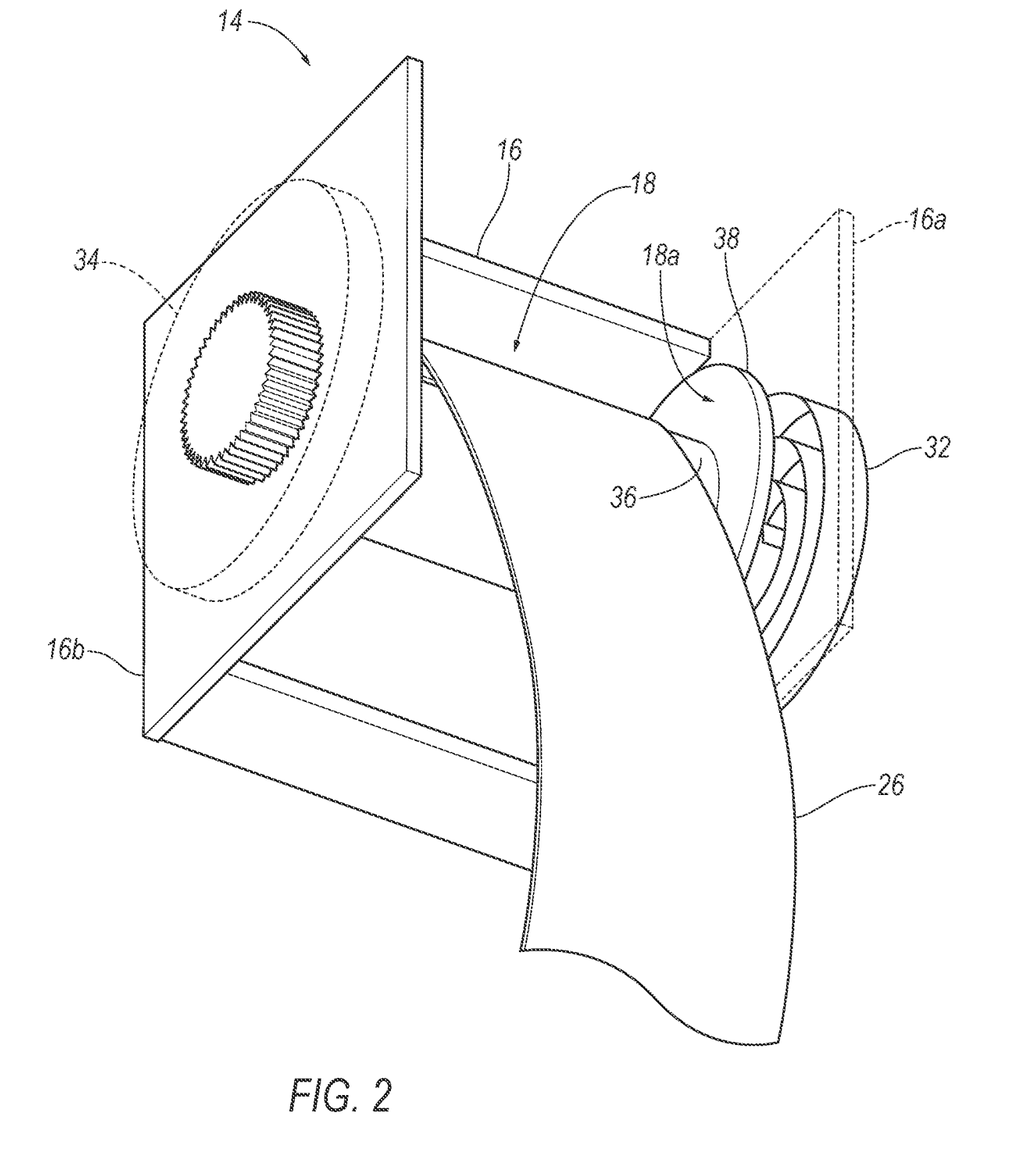
FIG. 2 is a perspective view of a seatbelt retractor.
Figure 3:
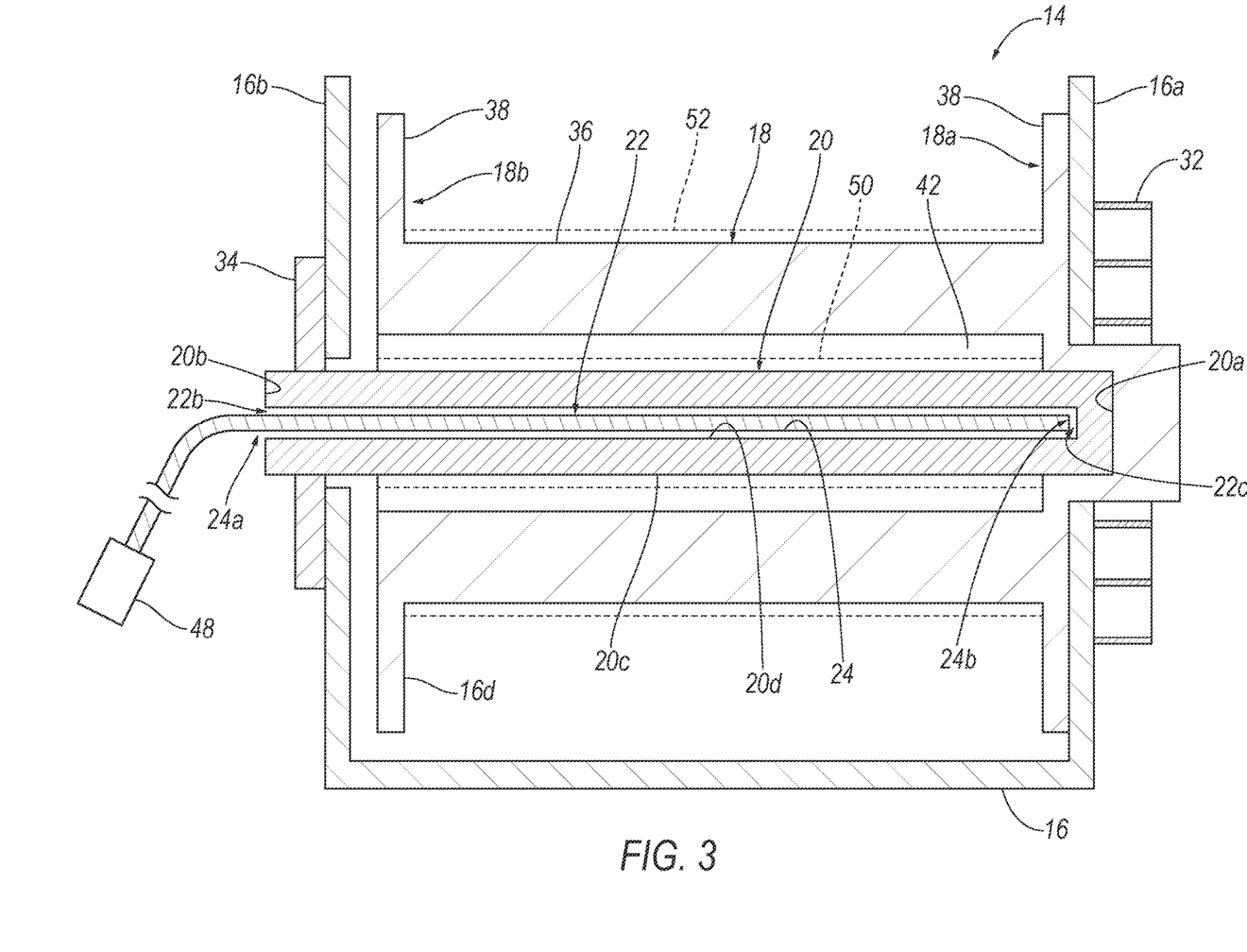
FIG. 3 is a cross-sectional view of the seatbelt retractor.
Figure 4:
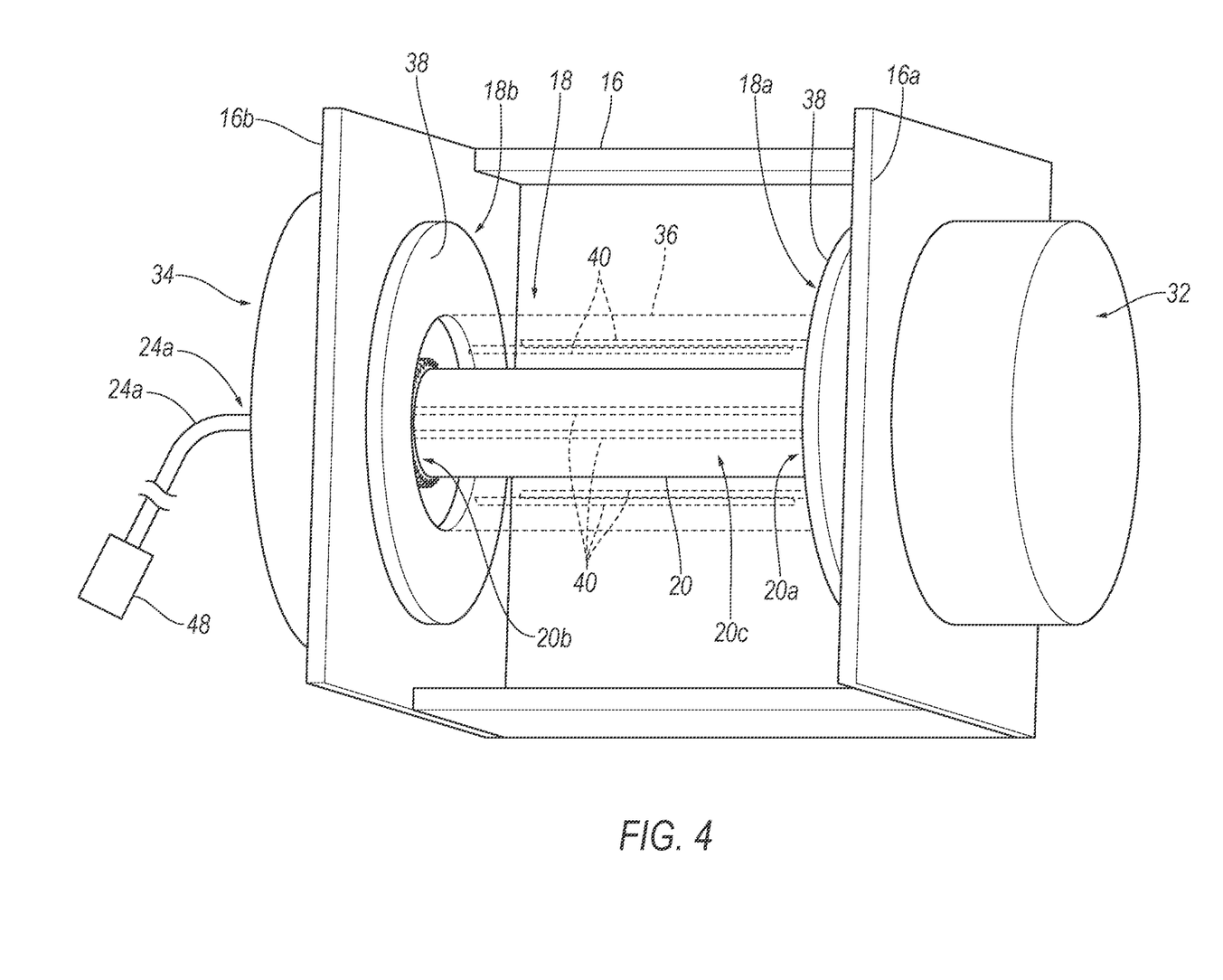
FIG. 4 is a perspective view of the seatbelt retractor.
Figure 5:
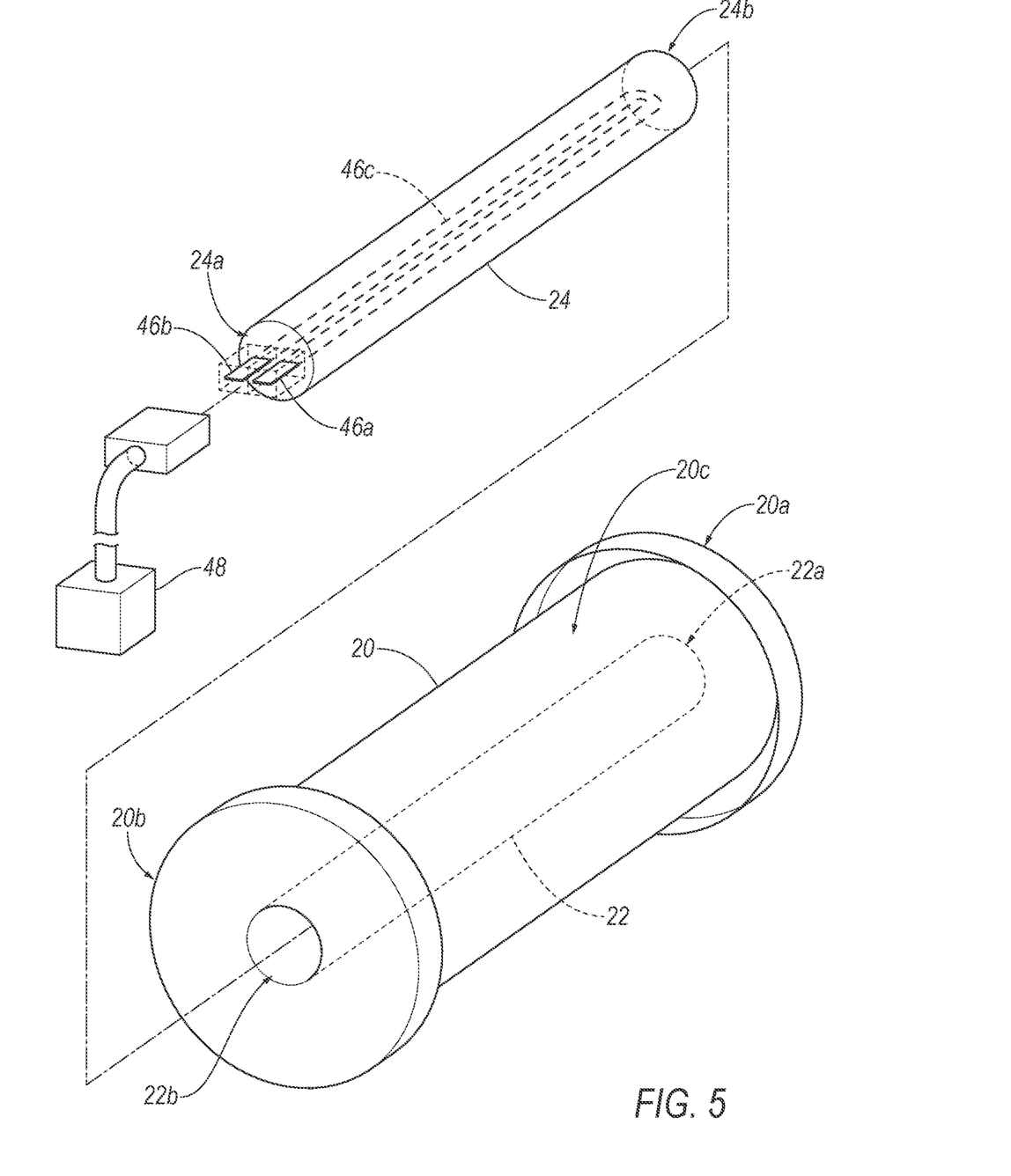
FIG. 5 is an exploded view of a torsion bar.

The seatbelt retractor 14 includes a locking device 34. Specifically, the housing 16 includes the locking device 34. As shown in FIG. 2, the locking device 34 is supported on the second end 16b of the housing 16. Specifically, the locking device 34 is coupled to the second end 16b of the housing 16 in any suitable manner, e.g., fasteners. The locking device 34 is engaged with the torsion bar 20 to restrict movement of the webbing 26. The locking device 34 is anchored to the housing 16 and is moveable relative to the torsion bar 20 between a locked position and an unlocked position. In the unlocked position, the locking device 34 allows rotation of an end of the torsion bar 20 relative to the housing 16 and, in the locked position, the locking device 34 prevents rotation of that end of the torsion bar 20 relative to the housing 16. Specifically, the locking device 34 is operatively engaged with the second end 20b of the torsion bar 20 when the locking device 34 is in the locked position.

The locking device 34 may be of a type known in the art and may be triggered in any suitable manner. As one example, the locking device 34 may engage the torsion bar 20 in response to deceleration of the vehicle 12, e.g., a sudden slowing of the vehicle 12, sudden stop, vehicle impact, etc. In other words, the locking device 34 may be moved from the unlocked position to the locked position by a change in inertia. The locking device 34 may engage the torsion bar 20 in response to an activation sensor (not shown). The activation sensor senses sudden deceleration of the vehicle 12 and triggers activation of the locking device 34, i.e., moves the locking device 34 to the locked position. As one example, the activation sensor may be in the seatbelt retractor 14 and may be, for example, a weighted pendulum, a centrifugal clutch, or any other suitable type.

The seatbelt retractor 14 includes the spool 18. The spool 18 is elongated along the axis from the first end to the second end. The spool 18 is rotatably supported by the housing 16. Specifically, the first end and the second end 18b of the spool 18 are each rotatably supported by the housing 16. The spool 18 is rotatable about the axis when the locking device 34 is in the unlocked position.

The first end 18a of the spool 18 is adjacent the first end 16a of the housing 16. The first end 18a of the spool 18 is fixed to the torsion bar 20, i.e., when the spool 18 rotates, the torsion bar 20 rotates. The second end 18b of the spool 18 is adjacent the second end 16b of the housing 16. The second end 18b of the spool 18 is radially spaced from the torsion bar 20.

The spool 18 may include a cylinder 36 and two flanges 38. As an example, shown in the Figures, the spool 18 includes one flange 38 at the first end 18a of the spool 18 and the other flange 38 at the second end 18b of the spool 18. The cylinder 36 is elongated from one flange 38 to the other flange 38. The flanges 38 maintain the position of the webbing 26 relative to the spool 18, i.e., the webbing 26 is between the flanges 38. As shown in the Figures the flanges 38 extend radially away from the axis.

The webbing 26 is supported by the spool 18. Specifically, the webbing 26 is supported on the cylinder 36 between the two flanges 38. As an example, shown in the Figures, the cylinder 36 includes slots 40. As shown in the Figures, the slots 40 are elongated along the axis. The slots 40 are sized and shaped to receive the webbing 26. The webbing 26 may be in the slots 40 and wound around the spool 18. The webbing 26 may be, for example, fixed to the spool 18 through the slots 40. The webbing 26 may be fixed to the spool 18 in any suitable manner.

The spool 18 includes a cavity 42. In examples with the cylinder 36, the cylinder 36 includes the cavity 42, i.e., the cylinder 36 is hollow. The torsion bar 20 is disposed in the cavity 42. As described below, the torsion bar 20 extends along the axis through the cavity 42. The spool 18 surrounds the torsion bar 20. The spool 18 may be of any suitable material, e.g., plastic, metal, composite, etc.

The seatbelt retractor 14 includes the torsion bar 20. The torsion bar 20 is elongated along the axis. Specifically, the torsion bar 20 is elongated from the first end 20a of the torsion bar 20 to the second end 20b of the torsion bar 20.

The first end 20a of the torsion bar 20 is operatively engaged with the housing 16 indirectly. Specifically, the first end 20a of the torsion bar 20 is fixed to the first end 18a of the spool 18, and the first end 18a of the spool 18 is operatively engaged with the spring 32. As described above, the spring 32 is coupled to the housing 16 and the spool 18, thus when the spool 18 rotates and exerts a force on the spring 32, the spring 32 exerts a force on the housing 16. The first end 20a of the torsion bar 20 may be fixed to the first end 18a of the spool 18 in any suitable manner, e.g., welding, adhesive, etc.

As described above and shown in the Figures, the second end 20b of the torsion bar 20 is operatively engaged with the housing 16 directly. Specifically, the second end 20b of the torsion bar 20 is operatively engaged with the locking device 34 in the locked position. In other words, when the locking device 34 moves from the unlocked position to the locked position, the torsion bar 20 engages the locking device 34 and restricts rotation of the spool 18.

The torsion bar 20 has the central cavity 22. The central cavity 22 is elongated between the first end 20a of the torsion bar 20 and the second end 20b of the torsion bar 20. The central cavity 22 may have a first end 22a and a second end 22b. Specifically, the first end 20a and the second end 20b of the torsion bar 20 may define the first end 22a and the second end 22b of the central cavity 22. The central cavity 22 may be open at the first end 20a of the torsion bar 20. As an example shown in the Figures, the central cavity 22 may terminate at the second end 20b of the torsion bar 20. As another example, the central cavity 22 may be open at the second end 20b of the torsion bar 20.

The central cavity 22 may be elongated on the axis. The central cavity 22 may be elongated between the first end 20a of the torsion bar 20 and the second end 20b of the torsion bar 20. As shown in the Figures, the central cavity 22 is centered in the torsion bar 20 on the axis. As another example, the central cavity 22 may be elongated on a different axis. In such an example, the central cavity 22 may be oriented in a way that affects the material properties of the torsion bar 20.

The torsion bar 20 may have an outer surface 20c and an inner surface 20d. The inner surface 20d defines the central cavity 22. The torsion bar 20 has an outer diameter, corresponding with the outer surface 20c, and an inner diameter, corresponding with the inner surface 20d. The torsion bar 20 has a wall thickness. The wall thickness is the distance between the inner surface 20d and the outer surface 20c, i.e., the wall thickness is measured by subtracting the inner diameter from the outer diameter and dividing by two. As an example, if the inner diameter is 0.25" and the outer diameter is 0.5", the wall thickness is 0.125". The torsion bar 20 may have any suitable inner diameter and outer diameter.

The central cavity 22 may be of any suitable shape, i.e., the cross-sectional shape of the inner surface 20d may be of any suitable shape. As an example, shown in the Figures, the central cavity 22 may be cylindrical, i.e., the cross-section is circular. As another example, the central cavity 22 may be of any suitable cross-sectional shape. The torsion bar 20 extends entirely around the central cavity 22.

The torsion bar 20 is designed to rotationally yield, e.g., plastically deform, as the torsion bar 20 is rotated by the spool 18 when fixed by the locking device 34. Specifically, the torsion bar 20 has a rotational yield strength. The torsion bar 20 is plastically deformable when the rotational force is above the rotational yield strength. When the torsion bar 20 is plastically deformed, the torsion bar 20 is permanently distorted. Specifically, when the torsion bar 20 is plastically deformed, the torsion bar 20 is twisted. The torsion bar 20 is designed to twist 0.5 to 1.0 revolutions when rotationally yielding under rotational force above the rotational yield strength.

The rotational yield strength of the torsion bar 20 is a function of the temperature of the torsion bar 20. Specifically, the temperature of the material of the torsion bar 20 increase or decrease the rotational yield strength. Specifically, the temperature of the material of the torsion bar 20 is inversely correlated with the rotational yield strength. In other words, when the temperature of the material of the torsion bar 20 increases, the rotational yield strength of the torsion bar 20 decreases. The torsion bar 20 is designed such that the rotational yield strength decreases as the temperature increases. As another example, rotational yield strength is a function of material properties of the torsion bar 20 including material type of the torsion bar 20, wall thickness of the torsion bar 20, length of the torsion bar 20, etc. the material itself may be chosen based on its rotational yield strength.

The seatbelt retractor 14 includes the heating filament 24. The heating filament 24 is operable to heat the torsion bar 20 to lower the rotational yield strength of the torsion bar 20, as described further below. The heating filament 24 is disposed in the central cavity 22 of the torsion bar 20. As shown in the Figures, the heating filament 24 is elongated in the central cavity 22. Specifically, the heating filament 24 is elongated between the first end 20a of the torsion bar 20 and the second end 20b of the torsion bar 20. The heating filament 24 may be of any suitable size. The heating filament 24 may be of any suitable material that can be repeatedly heated and cooled such as conductive metal, ceramic, etc.

The heating filament 24 has a terminal end 24a and a cavity end 24b. The heating filament 24 is elongated from the terminal end 24a to the cavity end 24b. The terminal end 24a is adjacent the first end 20a of the torsion bar 20. The cavity end 24b is adjacent the second end 20b of the torsion bar 20, i.e., in the central cavity 22. The cavity end 24b is spaced from the first end 20a of the torsion bar 20. As shown in the Figures, the terminal end 24a is spaced from the cavity end 24b.

The heating filament 24 includes a first terminal 46a and a second terminal 46b. The first terminal 46a and the second terminal 46b are disposed at the terminal end 24a. As shown in the Figures, the seatbelt retractor 14 may include a power source 48, as described further below. The first terminal 46a and the second terminal 46b connect to the heating filament 24 to the power source 48. As shown in the Figures, the first terminal 46a and the second terminal 46b are continuous in the heating filament 24. The heating filament 24 may include a conductive loop 46c, extending from the first terminal 46a toward the cavity end 24b, and then looping back to the second terminal 46b from the cavity end 24b. In operation, current from the power source 48 enters the heating filament 24, i.e., the conductive loop 46c, from the first terminal 46a and returns to the power source 48 at the second terminal 46b.

The heating filament 24 may be heated from an ambient temperature to an elevated temperature and an ambient temperature. The ambient temperature of the heating filament 24 is the temperature of the heating filament 24 without the input of the power source 48. In other words, the ambient temperature is the temperature of the heating filament 24 as influenced solely by the environment of the heating filament 24. The rotational yield strength of the torsion bar 20 is higher at the ambient temperature of the heating filament 24 than the elevated temperature. As an example, when the environmental temperature is 0 degrees Fahrenheit, the ambient temperature of the heating filament 24 may be lower than when the environmental temperature is 100 degrees Fahrenheit.

The elevated temperature of the heating filament 24 is the temperature of the heating filament 24 with the input of the power source 48. In other words, the elevated temperature of the heating filament 24 may be higher than the ambient temperature of the heating filament 24 because of the input of the power source 48. As an example, when the temperature of the environment of the torsion bar 20 is 0 degrees Fahrenheit, the elevated temperature may be, e.g., 70 degrees Fahrenheit due to the input of the power source 48.

The elevated temperature of the heating filament 24 can be modulated. Because the elevated temperature of the heating filament 24 is influenced by the power source 48 the elevated temperature of the heating filament 24 can increase or decrease in response to a change in the power source 48. Specifically, the current from the power source 48 flowing through heating filament 24, i.e., the conductive loop 46c, can be modulated. As one example, the current from the power source 48 may be increased to increase the elevated temperature. As another example, the current from the power source 48 may be decreased to decrease the elevated temperature.

As described above, the rotational yield strength of the torsion bar 20 is changed by changing the material properties of the torsion bar 20. Specifically, when the elevated temperature of the heating filament 24 is increased, the rotational yield strength of the torsion bar 20 is reduced.

Figure 6:
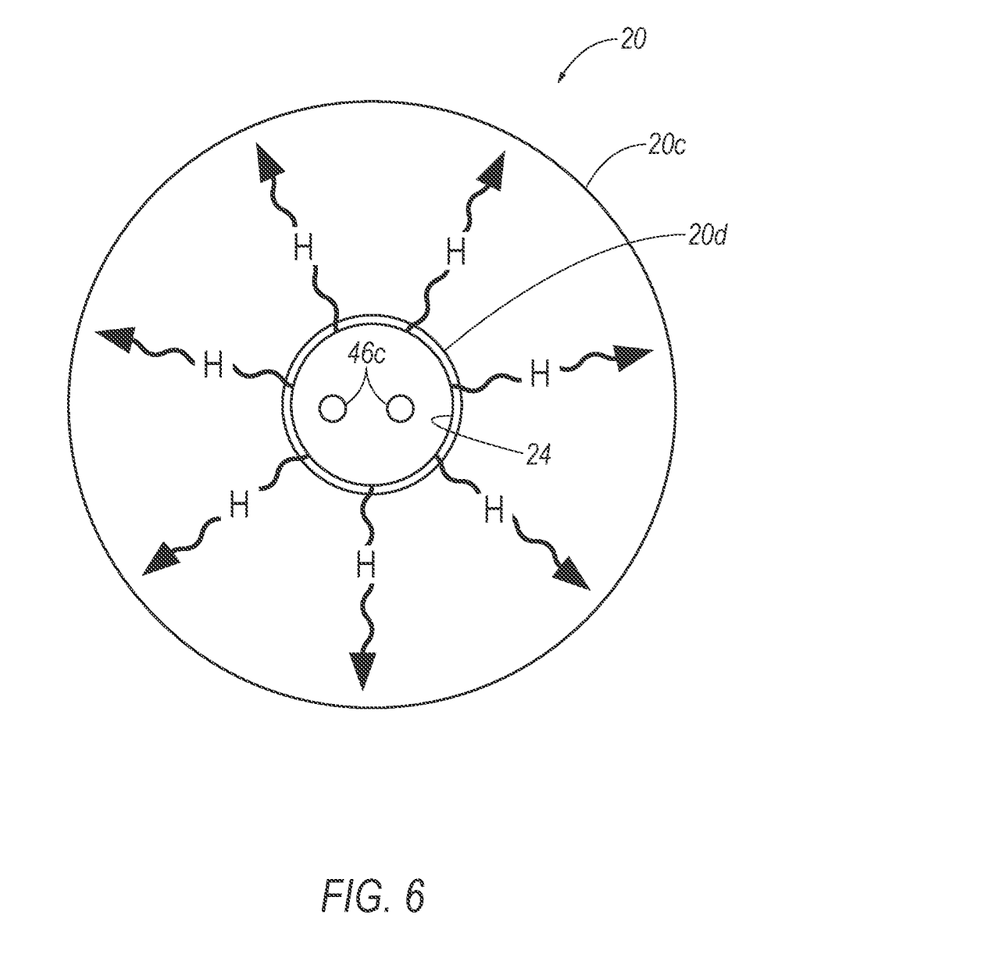
FIG. 6 is a cross-sectional view of the torsion bar.

As shown in FIG. 6, the heating filament 24 heats the torsion bar 20 radially from the center. Specifically, heat H transfers radially from the heating filament 24 to the outer surface 20c of the torsion bar 20. As another example, when the central cavity 22 is not elongated along the axis, the heating filament 24 heats the torsion bar 20 radially from the central cavity 22. When the torsion bar 20 is heated radially from the center, the torsion bar 20 is heated evenly.

The seatbelt retractor 14 includes the power source 48. As shown in the Figures, the heating filament 24 is connected to the power source 48. Specifically, the heating filament 24 is connected to the power source 48 at the terminal end 24a. And more specifically, the power source 48 is connected to the first terminal 46a and the second terminal 46b of the heating filament 24. The heating filament 24 may be connected to the power source 48 in any suitable manner, e.g., universal electrical connector, etc. The power source 48 increases the temperature of the heating filament 24 by increasing the current flowing through the heating filament 24, i.e., the conductive loop 46c. The power source 48 may be any suitable power source 48. As one example, the heating filament 24 may have a dedicated power source 48. As another example, the power source 48 may provide electrical power to multiple vehicle components.

The seatbelt retractor 14 may include a thermal insulator 50. The thermal insulator 50 may surround the torsion bar 20. The thermal insulator 50 may completely surround the torsion bar 20. Specifically, the thermal insulator 50 completely surrounds the torsion bar 20 inside the cylinder 36 of the spool 18. In the example shown in the Figures, the thermal insulator 50 is between the outer surface 20c of the torsion bar 20 and the cylinder 36 of the spool 18. The thermal insulator 50 may protect the spool 18 from the heat of the torsion bar 20. The thermal insulator 50 may also prevent heat loss from the torsion bar 20 to maintain a constant and/or consistent temperature. The seatbelt retractor 14 may include a second thermal insulator 52. The thermal insulator 50 may surround the torsion bar 20 and a second thermal insulator 52 may surround the spool 18. As shown in the Figures, the second thermal insulator 52 is between the spool 18 and the webbing 26. Similar to the thermal insulator 50, the second thermal insulator 52 may prevent heating of the webbing 26 from the heat of the torsion bar 20. The second thermal insulator 52 may also prevent heat loss from the torsion bar 20 via the spool 18, thereby maintaining a constant and/or consistent temperature. The thermal insulator 50 and the second thermal insulator 52 may be of any suitable material.

Figure 7:
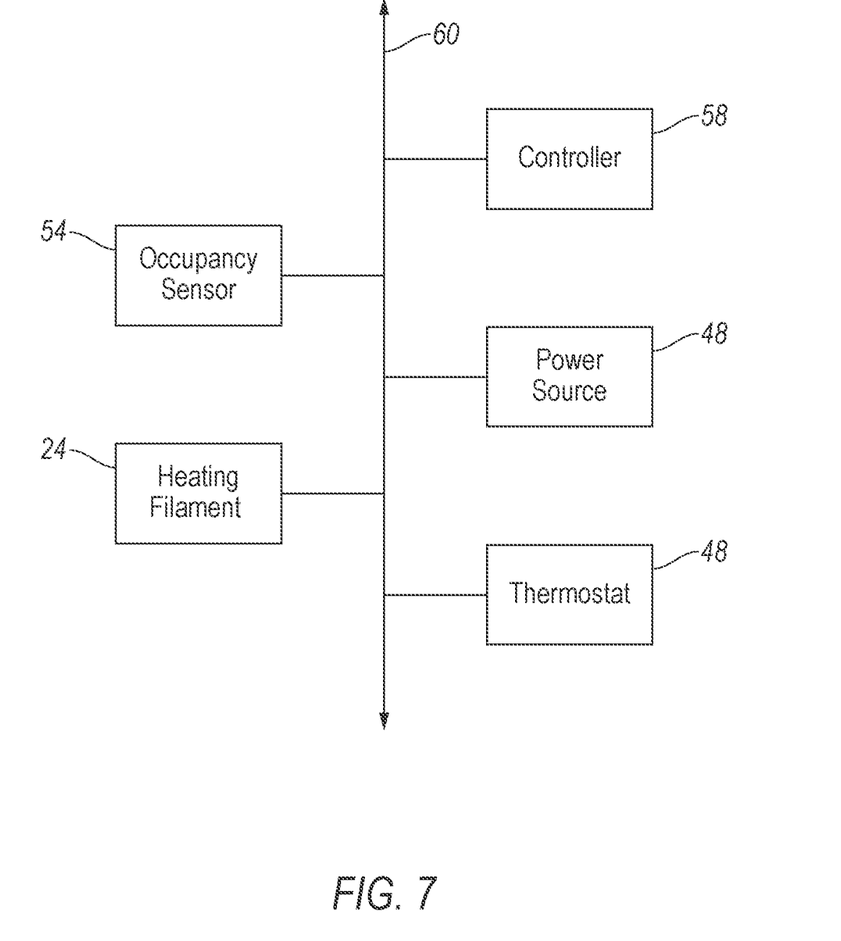
FIG. 7 is a block diagram of a vehicle communications network.

The vehicle 12 may include an occupancy sensor 54. The occupancy sensor 54 may be configured to at least detect occupancy of the seat. The occupancy sensor 54 may be visible-light or infrared cameras directed at the seat, pressure sensors inside the seat, sensors detecting whether a seatbelt for the seat 28 is buckled or unspool 18ed, or other suitable sensors. The occupancy sensor 54 is in communication with the controller 58 via the vehicle communications network 60.

The vehicle 12 may include a thermostat 56. The thermostat 56 may be configured to at least detect the temperature of the heating filament 24, i.e., the ambient temperature and the elevated temperature. The thermostat 56 may be connected to the heating filament 24 directly or indirectly. As an example, the thermostat 56 may be a component of the heating filament 24. As another example, the thermostat 56 may be disposed in the cylinder 36 of the spool 18. As yet another example, the thermostat 56 may be connected to the heating filament 24 in any suitable manner. The thermostat 56 is in communication with the controller 58 via the vehicle communications network 60.

The seatbelt retractor 14 includes a controller 58. The controller 58 may be a microprocessor-based computing device implemented via circuits, chips, or other electronic components. The controller 58 may include a processor, memory, etc. The memory of the controller 58 may store instructions executable by the processor and the processor may read the instructions from the memory and execute the instructions. Specifically, the memory stores instructions executable by the processor, i.e., the controller 58 is programmed to determine occupant size and modulate the temperature of the heating filament 24 based on occupant size. The controller 58 may be, for example, a restraints control module. Use of "in response to," "based on," and "upon determining" with reference to the controller 58 and the processes performed by the controller 58 indicates a causal relationship, not merely a temporal relationship. The controller 58 may transmit signals through the vehicle communications network 60 such as a controller 58 area network (CAN) bus, Ethernet, Local Interconnect Network (LIN), and/or by any other wired or wireless vehicle communications network 60.

The controller 58 may be programmed to modulate the elevated temperature of the heating filament 24. As described above, the heating filament 24 is connected to the power source 48 and the temperature of the heating filament 24 is increased or decreased based on the current from the power source 48. The current flow through the heating filament 24 is directly correlated with the temperature of the heating filament 24, i.e., as the current increases, the temperature increases. The controller 58 is programmed to modulate the power source 48. Specifically, the controller 58 is programmed to modulate the current of the power source 48. More specifically, the controller 58 may be programmed to increase or decrease the current flowing from the power source 48 to the heating filament 24. As one example, the controller 58 may act on the power source 48, i.e., the controller 58 adjusts the current leaving the power source 48. As another example, the controller 58 may modify the current from the power source 48 between the power source 48 and the heating filament 24. In such an example, the power source 48 may output a constant voltage and the controller 58 may increase or decrease the resistance of the connection between the power source 48 and the heating filament 24 to increase or decrease the current flowing through the heating filament 24. As another example, the controller 58 may modulate the elevated temperature of the heating filament 24 in any suitable manner.

The controller 58 is programmed to increase the temperature of the heating filament 24 to an elevated temperature in response to a detected occupant size. As an example, the controller 58 is programmed to increase the temperature of the heating filament 24 in response to an occupant size that is smaller than a $95^{th}$-percentile male.

The controller 58 may be programmed to modulate the elevated temperature of the heating filament 24 in response to a detected occupant size. The controller 58 may be programmed to modulate the elevated temperature in any suitable manner, as described above, e.g., modulate the power source 48 in response to a detected occupant size. In the example where the controller 58 is programmed to modulate the elevated temperature of the heating filament 24 in response to a detected occupant size, the controller 58 is programmed to increase the elevated temperature of the heating filament 24 in response to a detected occupant size that is smaller than a $95^{th}$-percentile male, as described further below.

The controller 58 is programmed to modulate the elevated temperature of the heating filament 24 up or down, i.e., increase or decrease the elevated temperature. As an example, a first occupant may occupy the seat 28 and a second occupant may occupy the same seat 28 after the first occupant exits the vehicle 12. Such a scenario may result from for example, operation of the vehicle 12 as a ride-share vehicle. The second occupant may be larger or smaller than the first occupant. In the event that the second occupant is larger than the first occupant, but smaller than a $95^{th}$-percentile male, the controller 58 is programmed to reduce the elevated temperature from the first occupant to an elevated temperature that is higher than the ambient temperature. In the event that the second occupant is smaller than the first occupant, the controller 58 is programmed to increase the elevated temperature from the elevated temperature of the first occupant.

The controller 58 may be programmed to determine occupant size based on input from the occupancy sensor 54. As one example, the controller 58 can receive an image of the seat 28 from the occupancy sensor 54, i.e., the occupancy sensor 54 is a visible light or infrared camera. The controller 58 can determine the occupancy size by using image processing techniques. As another example, the controller 58 can receive a pressure input from the occupancy sensor 54, i.e., the occupancy sensor 54 is a pressure sensor in the seat. The controller 58 can determine the occupancy size by, for example, referring to a database, i.e., a lookup table, that contains values from the pressure sensor and corresponding occupancy sizes.

Figure 8:
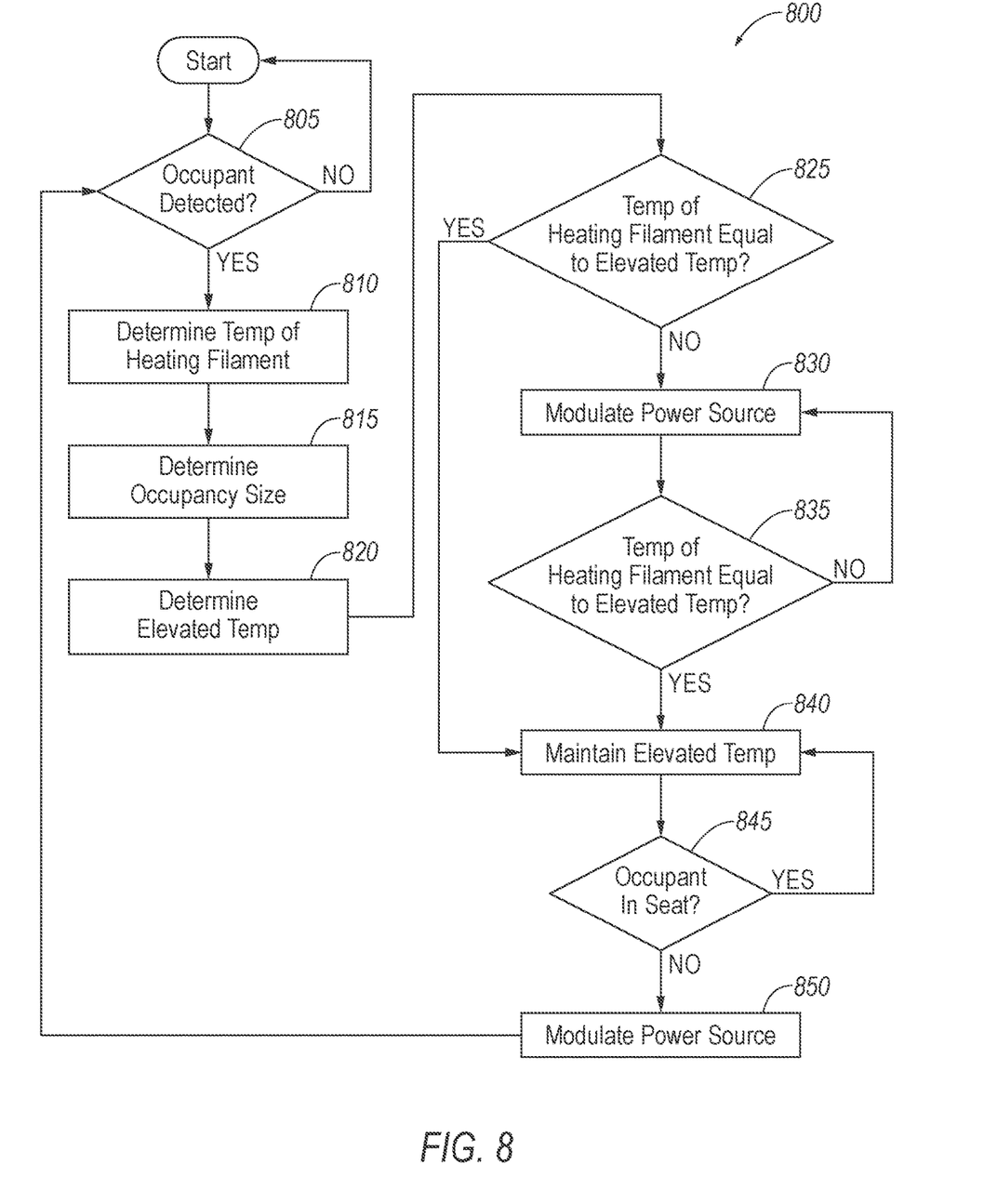
FIG. 8 is a block diagram of the operation of the torsion bar in response to an occupant force.

As an example shown in FIG. 8, the controller 58 may perform process 800.

The process begins in block 805. In decision block 805, the controller 58 determines whether an occupant is seated on the seat 28 in response to at least input from the occupancy sensor 54. As an example, the controller 58 can receive an image of the seat 28 and determine, via image processing techniques, that an occupant is seated on the seat. As another example, the controller 58 can receive a pressure input from the occupancy sensor 54 and determine that an occupant is seated on the seat. When the controller 58 determines an occupant is seated on the seat, the process moves to block 810.

In block 810, the controller 58 determines the temperature of the heating filament 24. As one example, the heating filament 24 may be at the ambient temperature. As another example, the heating filament 24 may be at the elevated temperature for a prior occupant, i.e., an occupant left the vehicle 12 prior to the new occupant detected in block 805. When the controller 58 determines the temperature of the heating filament 24, the process moves to block 815.

In block 815, the controller 58 determines the size of the occupant. As described above, the controller 58 may receive an input from the occupancy sensor 54 and, based upon at least that input, determine the size of the occupant seated on the seat. As an example, the controller 58 may receive an image of the seat 28 and determine, via image processing techniques, the size of the occupant seated on the seat. As another example, the controller 58 may receive a pressure input from the occupancy sensor 54 and determine the size of the occupant seated on the seat. When the controller 58 has determined the size of the occupant, the process moves to block 820. Blocks 810 and 815 may be performed in any order (i.e., 810 before 815 or 815 before 810) or may be performed simultaneously.

In block 820, the controller 58 determines the elevated temperature based on the size of the occupant seated on the seat. As one example, the controller 58 may compare the size of the occupant with a lookup table having elevated temperatures that correspond to specific occupancy sizes. In such an example, the controller 58 determined the necessary elevated temperature by referencing the lookup table. As another example, the controller 58 may use an equation to determine the elevated temperature for the previously determined occupancy size. When the necessary elevated temperature is determined, the process moves to decision block 825.

With reference to decision block 825, the controller 58 compares the temperature of the heating filament 24, as determined in block 810, with the necessary elevated temperature of the heating filament 24, as determined in block 820. If the temperature of the heating filament 24 is equal to the necessary elevated temperature, the process moves to block 840. If the temperature of the heating filament 24 is not equal to the necessary elevated temperature, the process moves to block 830.

With reference to block 830, the controller 58 modulates the power source 48 to increase or decrease the temperature of the heating filament 24 as required to reach the necessary elevated temperature determined in block 820. As an example, if the necessary elevated temperature is higher than the temperature of the heating filament 24 determined in block 810, the controller 58 modulates the power source 48 to increase the temperature of the heating filament 24. As another example, if the necessary elevated temperature is lower than the temperature of the heating filament 24 determined in block 810, the controller 58 modulates the power source 48 to decrease the temperature of the heating filament 24. The process moves to block 835.

With reference to block 835, the controller 58 determines if the temperature of the heating filament 24 is equal to the necessary elevated temperature. If the temperature of the heating filament 24 is not equal to the necessary elevated temperature, the process returns to block 830. If the temperature of the heating filament 24 is equal to the necessary elevated temperature, the process moves to block 840.

With reference to block 840, the controller 58 maintains the elevated temperature of the heating filament 24. As an example, the controller 58 may modulate the power source 48 to maintain the elevated temperature of the heating filament 24, e.g., to account for thermal transfer. The process moves to block 845.

With reference to block 845, the controller 58 determined whether the occupant is seated on the seat. While the occupant occupies the seat, the process returns to block 840 to maintain the elevated temperature of the heating filament 24. When the controller 58 no longer detects an occupant seated on the seat, the process moves to block 850.

With reference to block 850, the controller 58 modulates the power source 48 in a manner that allows the heating filament 24 to return to the ambient temperature. In other words, the controller 58 modulates the power source 48 to reduce the elevated temperature of the heating filament 24 to the ambient temperature. The process returns to block 805 to determine if an occupant is seated on the seat. As an example, an occupant may exit the vehicle 12 to perform a task, e.g., putting a piece of mail in a mailbox, and then return to the vehicle 12 without turning off the vehicle 12. In such an example, the process returns to block 805 to determine when the occupant is seated on the seat. As another example, the vehicle 12 may be a ride-share vehicle, such as a taxi described above. In such an example, a first occupant may exit the vehicle 12 and the driver of the taxi picks up a second occupant. Because the process returns to block 805, when the first occupant exits the vehicle 12, the controller 58 can determine when the second occupant enters the vehicle 12 and is seated on the seat.

It is appreciated that certain steps in process 800 can be performed in parallel or in a different sequence. As an example, blocks 805 and 810 can be performed in parallel. As another example, block 810 can occur in parallel with block 815 or 820, or can occur after block 815 or 820. As yet another example, block 850 and block 805 can be performed in parallel, i.e., the controller 58 can modulate the power source 48 to reduce the elevated temperature of the heating filament 24 to the ambient temperature, while determining if a new occupant is seated on the seat.

As shown in the Figures, the seatbelt retractor 14 includes the housing 16, the spool 18, and the torsion bar 20. The seatbelt retractor 14 provides extension and retraction of the webbing 26, e.g., to adjust a length of the webbing 26 to accommodate various sized occupants. The seatbelt retractor 14 may be designed to selectively restrict extension of the webbing 26, e.g., during a vehicle impact.

As an example, during a vehicle impact the seatbelt retractor 14 restricts extension of the webbing 26 to restrict movement of the occupant away from the seat. The occupant may be urged away from the seat 28 in response to a sudden deceleration of the vehicle 12. When the occupant is urged away from the seat, the occupant exerts the occupant force on the webbing 26 and the seatbelt retractor 14. The seatbelt retractor 14 has the locking device 34. The locking device 34 may engage the torsion bar 20 in response to sudden deceleration of the vehicle 12. When the locking device 34 is in the locked position, the seatbelt retractor 14 restricts extension of the webbing 26. Specifically, the seatbelt retractor 14 includes the torsion bar 20. When the occupant force on the webbing 26 and the seatbelt retractor 14 meets or exceeds the rotational yield strength of the torsion bar 20, the torsion bar 20 plastically deforms and permits additional webbing 26 to be extended from the seatbelt retractor 14, until the occupant force no longer exceeds the rotational yield strength of the torsion bar 20.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A seatbelt retractor comprising:
a housing;
a spool having a first end and a second end each rotatably supported by the housing, the spool being elongated on an axis from the first end to the second end;
a torsion bar having a first end fixed to the first end of the spool and a second end operatively engaged with the housing;
the torsion bar having a central cavity; and
a heating filament disposed in the central cavity.

2. The seatbelt retractor of claim 1, wherein the central cavity is elongated between the first end of the torsion bar and the second end of the torsion bar.

3. The seatbelt retractor of claim 1, wherein the heating filament is elongated between the first end of the torsion bar and the second end of the torsion bar.

4. The seatbelt retractor of claim 3, wherein the heating filament has a terminal end, the terminal end being adjacent the first end of the torsion bar.

5. The seatbelt retractor of claim 1, further comprising a controller programmed to modulate an elevated temperature of the heating filament.

6. The seatbelt retractor of claim 5, wherein the controller is programmed to modulate the elevated temperature of the heating filament in response to a detected occupant size.

7. The seatbelt retractor of claim 6, wherein the controller is programmed to determine occupant size based on input from an occupancy sensor.

8. The seatbelt retractor of claim 6, wherein the controller is programmed to increase the elevated temperature of the heating filament in response to a detected occupant size.

9. The seatbelt retractor of claim 5, wherein the torsion bar has a rotational yield strength, the rotational yield strength being lowered by the elevated temperature of the heating filament.

10. The seatbelt retractor of claim 1, further comprising a thermal insulator, the thermal insulator surrounding the torsion bar.

11. The seatbelt retractor of claim 10, further comprising a second thermal insulator, the second thermal insulator surrounding the spool.

12. The seatbelt retractor of claim 1, further comprising a thermal insulator, the thermal insulator surrounding the spool.

13. The seatbelt retractor of claim 12, further comprising a webbing surrounding the spool, the insulator being between the spool and the webbing.

14. The seatbelt retractor of claim 1, further comprising a power source, the heating filament being connected to the power source.

15. The seatbelt retractor of claim 14, wherein the heating filament includes a terminal end and a cavity end, the power source being connected to the terminal end.

16. The seatbelt retractor of claim 14, further comprising a controller, the controller programmed to modulate the power source in response to a detected occupant size.

17. The seatbelt retractor of claim 1, the housing having a first end and a second end, and further comprising a locking device supported on the second end of the housing and being operatively engaged with the second end of the torsion bar.

* * * * *